(12) United States Patent
Yun et al.

(10) Patent No.: US 9,487,673 B2
(45) Date of Patent: Nov. 8, 2016

(54) INTERIOR SHEET FOR VEHICLES AND METHOD FOR MANUFACTURING SAME

(71) Applicant: LG Hausys, Ltd., Seoul (KR)

(72) Inventors: Su Hyeong Yun, Busan (KR); Yong Bae Jung, Ulsan (KR); Chul Hee Min, Daegu (KR)

(73) Assignee: LG Hausys, Ltd., Seoul (KR)

( * ) Notice: Subject to any disclaimer, the term of this patent is extended or adjusted under 35 U.S.C. 154(b) by 46 days.

(21) Appl. No.: 14/416,091

(22) PCT Filed: Dec. 28, 2012

(86) PCT No.: PCT/KR2012/011740
§ 371 (c)(1),
(2) Date: Jan. 21, 2015

(87) PCT Pub. No.: WO2014/025104
PCT Pub. Date: Feb. 13, 2014

(65) Prior Publication Data
US 2015/0152288 A1    Jun. 4, 2015

(30) Foreign Application Priority Data

Aug. 7, 2012   (KR) .................. 10-2012-0086233

(51) Int. Cl.
| | |
|---|---|
| *C09D 175/16* | (2006.01) |
| *B05D 3/06* | (2006.01) |
| *B60N 2/58* | (2006.01) |
| *B60R 13/02* | (2006.01) |
| *C08F 299/06* | (2006.01) |
| *C08F 299/08* | (2006.01) |
| *C08L 83/00* | (2006.01) |
| *C08L 33/14* | (2006.01) |
| *C09D 133/14* | (2006.01) |

(52) U.S. Cl.
CPC ............. *C09D 175/16* (2013.01); *B05D 3/068* (2013.01); *B60N 2/5891* (2013.01); *B60R 13/02* (2013.01); *C08F 299/065* (2013.01); *C08F 299/08* (2013.01); *C08L 33/14* (2013.01); *C08L 83/00* (2013.01); *C09D 133/14* (2013.01); *C08J 2433/00* (2013.01); *C08L 2312/06* (2013.01); *Y10T 428/265* (2015.01); *Y10T 428/31551* (2015.04)

(58) Field of Classification Search
CPC ........ C08L 33/14; C08L 43/04; C08L 83/00; C08L 83/04; C08L 101/00; C08L 2205/03; C08L 2312/06; C08F 299/065; C08F 299/08; C09D 133/14; C09D 175/16; C08J 2433/00; B05D 3/068; B60R 13/02; B60N 2/5891
USPC ................... 428/423.1, 423.3, 424.6, 424.8; 427/457, 503
See application file for complete search history.

(56) References Cited

U.S. PATENT DOCUMENTS

| | | | |
|---|---|---|---|
| 2002/0094439 A1 | 7/2002 | Edelmann et al. | |
| 2006/0258765 A1 * | 11/2006 | Ramsey | .................... 522/71 |
| 2007/0111007 A1 | 5/2007 | Wilkenhoener et al. | |
| 2008/0041273 A1 * | 2/2008 | Baumgart et al. | ....... 106/287.13 |
| 2013/0310464 A1 * | 11/2013 | Jaunky et al. | ............. 514/772.1 |

FOREIGN PATENT DOCUMENTS

| | | |
|---|---|---|
| JP | 2004160932 A | 6/2004 |
| KR | 100286213 B1 | 3/2001 |
| KR | 100496767 B1 | 6/2005 |
| KR | 100961940 B1 | 6/2010 |
| WO | 2005108434 A1 | 11/2005 |

OTHER PUBLICATIONS

Database search results dated Jul. 9, 2003 for "Photocurable (meth)acrylate resin compositions with good stain removability, their coatings, and coated articles", corresponding to XP-002744528A, 2 pages.
Database search results dated Jun. 26, 2001 for "Organic polymer particles, their manufacture, and surface-smoothing agents useful for organic resin films", corresponding to XP-002744529A, 2 pages.
Extended European Search Report dated Sep. 29, 2015 in connection with the counterpart European Patent Application No. 12882613.8.
International Search Report for PCT/KR2012/011740 mailed on May 9, 2013.

* cited by examiner

*Primary Examiner* — Thao T Tran
(74) *Attorney, Agent, or Firm* — Hauptman Ham, LLP

(57) ABSTRACT

The present invention relates to an interior sheet for vehicles which includes a surface-treated layer which is formed from the electron beam cross-linking of a siloxane-modified urethane-based acrylate resin, silicone acrylate, and polysiloxane.

10 Claims, No Drawings

INTERIOR SHEET FOR VEHICLES AND METHOD FOR MANUFACTURING SAME

TECHNICAL FIELD

The present invention relates to an interior sheet for vehicles and a method for manufacturing the same.

BACKGROUND ART

Materials such as polyvinyl chloride (PVC) artificial leather, polyurethane (PU) artificial leather, natural leather, textiles, and the like may be processed and used as an interior sheet for vehicles. In order to impart final surface physical properties to these materials, polyvinyl chloride artificial leather, polyurethane artificial leather, and natural leather are generally surface-treated with a heat curable treating agent. The sheets obtained by surface treatment with heat curable treating agents have limitations in accomplishing required surface physical properties such as stain resistance for jeans and the like.

DISCLOSURE

Technical Problem

It is an aspect of the present invention to provide an interior sheet for vehicles having improved surface physical properties such as stain resistance for jeans and the like.

It is another aspect of the present invention to provide a method for manufacturing the interior sheet for vehicles as set forth above.

Technical Solution

One embodiment of the present invention provides an interior sheet for vehicles, which includes a surface-treated layer formed by electron beam cross-linking of a siloxane-modified urethane-based acrylate resin, silicone acrylate, and polysiloxane.

The surface-treated layer may include 100 parts by weight of the siloxane-modified urethane-based acrylate resin, about 20 parts by weight to about 35 parts by weight of the silicone acrylate, and about 1 part by weight to about 15 parts by weight of the polysiloxane.

The siloxane-modified urethane-based acrylate resin may include bifunctional siloxane-modified urethane-based acrylate resins and trifunctional siloxane-modified urethane-based acrylate resins.

The surface-treated layer may have a thickness of about 1 μm to about 20 μm.

The interior sheet for vehicles may further include a substrate to have a multilayer structure. The substrate may include one selected from the group consisting of polyvinyl chloride, polyurethane, thermoplastic polyurethane, thermoplastic polyolefin resins, and combinations thereof.

The surface-treated layer may have an elongation of about 20% to about 150%.

The surface-treated layer may further include an additive selected from the group consisting of dispersants, matting agents, defoaming agents, and combinations thereof.

Another embodiment of the present invention provides a method for manufacturing an interior sheet for vehicles, including: applying a composition for surface treatment to a substrate, the composition for surface treatment including a siloxane-modified urethane-based acrylate resin, silicone acrylate, and polysiloxane; and irradiating the applied composition with electron beams to form a surface-treated layer.

The surface-treated layer may be formed by electron beam irradiation at a voltage of about 50 keV to about 300 keV.

The surface-treated layer may be formed by electron beam irradiation at an electron dose of about 10 kGy to about 100 kGy.

The substrate may include one selected from the group consisting of polyvinyl chloride, polyurethane, thermoplastic polyurethane, thermoplastic polyolefin resins, and combinations thereof.

Advantageous Effects

The interior sheet for vehicles has excellent surface physical properties such as stain resistance for jeans, sunscreen resistance, and the like.

BEST MODE

Hereinafter, embodiments of the present invention will be described in detail. However, it should be understood that the following embodiments are provided for illustrative purposes only and are not to be in any way construed as limiting the present invention. The scope and sprit of the present invention should be defined only by the accompanying claims and equivalents thereof.

One embodiment of the present invention provides an interior sheet for vehicles which includes a surface-treated layer formed by electron beam cross-linking of a siloxane-modified urethane-based acrylate resin, silicone acrylate, and polysiloxane.

The interior sheet for vehicles may further include a substrate to have a multilayer structure. In one embodiment, the interior sheet for vehicles may be prepared by forming a surface-treated layer by treating the surface of the substrate with a composition for surface treatment.

The composition for surface treatment is an electron beam (EB) cross-linkable composition, and includes a siloxane-modified urethane-based acrylate resin, silicone acrylate, and polysiloxane. For example, the composition for surface treatment may be a solvent- or water-containing composition. The composition may be applied to a surface of the substrate, followed by irradiation with electron beams to cross-link and cure the resin, thereby forming a surface-treated layer.

Since the interior sheet for vehicles forms the surface-treated layer by electron beam irradiation, it is possible to prevent reduction in physical properties of the substrate by increasing curing density or lowering surface tension of the composition for surface treatment. Therefore, the interior sheet for vehicles can have excellent physical properties such as stain resistance for jeans, sunscreen resistance, and the like.

Specifically, the substrate may include one selected from the group consisting of polyvinyl chloride, polyurethane, thermoplastic polyurethane, thermoplastic polyolefin resins, and combinations thereof, without being limited thereto. For example, an artificial leather sheet made of polymer resins may be used as the substrate. The interior sheet for vehicles may be prepared by forming a surface-treated layer on a surface of the artificial leather sheet made of such polymer resins. Namely, the substrate may be artificial leather sheets formed of the polymer resins. The artificial leather may be prepared from a material such as PVC, polyurethane, and the like.

The surface-treated layer may have an elongation of about 20% to about 150%. When the composition for surface treatment having components as set forth above is irradiated with electron beams, the surface-treated layer can improve adhesion to the substrate and can be cross-linked without reducing elongation, thereby enabling use of substrates having various elongations from soft substrates to hard substrates.

The surface-treated layer may have a thickness of about 1 µm to about 20 µm.

In addition, in order to form the surface-treated layer, the composition for surface treatment applied to the substrate may be, for example, cured by electron beam irradiation at a voltage of about 50 keV to about 300 keV. Specifically, the composition for surface treatment may be cured by electron beam irradiation at a voltage of about 100 keV to about 150 keV, more specifically about 120 keV to about 150 keV. Use of electron beams at a voltage within this range can improve curing efficiency of electron beams for the aforementioned thickness.

In order to form the surface-treated layer, the composition for surface treatment applied to the substrate may be, for example, cured by electron beam irradiation at an electron beam dose of, for example, about 10 kGy to about 100 kGy, specifically about 30 kGy to about 45 kGy. By electron beam irradiation at electron beam dose within the above range, the surface-treated layer is formed. Consequently, it is possible to prevent deformation of the substrate due to changes in color and cross-linking density while increasing a degree of curing the surface-treated layer.

As the siloxane-modified urethane-based acrylate resin included in the surface-treated layer, specifically, bifunctional siloxane-modified urethane-based acrylate resins, trifunctional siloxane-modified urethane-based acrylate resins, multi-functional siloxane modified urethane-based acrylates or mixtures thereof may be used in order to satisfy physical properties such as elongation, stain resistance, and the like. For example, as the siloxane-modified urethane-based acrylate resin, bifunctional siloxane-modified urethane-based acrylate resins, trifunctional siloxane-modified urethane-based acrylate resins, or mixtures thereof may be used. Siloxane can lower surface tension to improve stain resistance, while increasing mold releasability and water repellency. The siloxane-modified urethane-based acrylate resin may be, for example, urethane-based acrylate resins modified with a polysiloxane containing a high content of dimethyl siloxane as a structural unit. Specifically, the siloxane-modified urethane-based acrylate resin may be a block copolymer or a graft copolymer of siloxane and urethane-based acrylate. In order to improve elongation of the interior sheet for vehicles, particularly elongation of the surface-treated layer formed through electron beam cross-linking, the bifunctional siloxane-modified urethane-based acrylate resin may be prepared from a polyol having a high molecular weight. Further, the bifunctional siloxane-modified urethane-based acrylate resin may also be prepared using a polycarbonate-type polyether or polyester having excellent weather resistance and stain resistance.

The silicone acrylate included in the surface-treated layer may be, specifically, a silicone acrylate having four or more acrylate end groups. As such, the silicone acrylate having four or more acrylate end groups can enhance the degree of curing and be used in an excessive amount, thereby ensuring significantly remarkable effects in view of weather resistance and stain resistance.

The silicone acrylate may be present in an amount of about 20 parts by weight to about 35 parts by weight, specifically, about 25 to about 30 parts by weight, based on 100 parts by weight of the siloxane-modified urethane-based acrylate resin. The surface-treated layer including the silicone acrylate within the aforementioned amount can exhibit stain resistance while preventing a whitening phenomenon of a cured coating film due to problems in compatibility with the resin.

Specifically, the polysiloxane included in the surface-treated layer may include dimethyl polysiloxane in a high content. After electron beam cross-linking of the surface-treated layer, the polysiloxane side chain may be grafted to a urethane-based acrylate main chain backbone within the siloxane-modified urethane-based acrylate resin.

The polysiloxane may be present in an amount of about 1 part by weight to about 15 parts by weight, specifically about 5 parts by weight to about 10 parts by weight, based on 100 parts by weight of the siloxane-modified urethane-based acrylate resin. The surface-treated layer including the aforementioned amount of the polysiloxane can impart stain resistance. As set forth above, by electron beam cross-linking, the polysiloxane side chain may be easily grafted to a urethane-based acrylate main chain backbone within the siloxane-modified urethane-based acrylate resin.

Since the composition for surface treatment of the invention has a relatively high solid content as compared with heat curable resin compositions, the composition for surface treatment has an effect of decreasing use of volatile organic compounds. Further, since the heat curable resins have a higher molecular weight than that of the resin included in the composition for surface treatment of the present invention, suitable volatilization of the remaining solvents may not be ensured. In this regard, the composition for surface treatment of the present invention exhibits much better effects in reducing smell as compared with heat curable resins.

The composition for surface treatment may further include an additive selected from the group consisting of dispersants, matting agents, defoaming agents, and combinations thereof. The interior sheet of the present invention further includes the surface-treated layer formed by curing the composition with electron beams. The composition for surface treatment may include, for example, about 20 parts by weight to about 25 parts by weight of an additive, based on 100 parts by weight of the siloxane-modified urethane-based acrylate resin.

The dispersant can inhibit agglomeration of the matting agent while enhancing paint storage property and compatibility with the paint.

The matting agent provides a matting effect to the interior sheet, thereby ensuring a lusterless surface. Further, it is possible to inhibit agglomeration of the matting agent, enhance paint storage property and prevent a whitening phenomenon.

The defoaming agent provides defoaming properties to the interior sheet and can maintain surface leveling properties even when a strong defoaming agent for silicon is used.

The interior sheet for vehicles is suitable to be used as cover materials, such as sheet covers for vehicle interiors (seat covers), center panels, doors, headliners, and the like. As mentioned above, since the interior sheet for vehicles accomplishes excellent surface physical properties, extreme surface physical properties such as stain resistance for jeans, sunscreen resistance, and the like, which are hard to realize in the artificial leather sheet covers (seat covers) obtained by surface treatment of heat curable resins.

Another embodiment of the present invention provides a method for manufacturing an interior sheet for vehicles, including: applying a composition for surface treatment to a substrate, the composition for surface treatment including a siloxane-modified urethane-based acrylate resin, silicone acrylate, and polysiloxane; and irradiating the applied composition with electron beams to form a surface-treated layer.

By the method for manufacturing an interior sheet for vehicles, it is possible to prepare the interior sheet for vehicles.

The surface-treated layer may be formed by electron beam irradiation at a voltage of about 50 keV to about 300 keV.

The surface-treated layer may be formed by electron beam irradiation at an electron dose of about 10 kGy to about 100 kGy.

A detailed description of the substrate is set forth above.

The process for preparing the interior sheet for vehicles will be described with reference to one example. In order to prepare the interior sheet for vehicles, calendering machines, foaming machines, printing machines (coating machines), EB irradiators, and the like may be employed. Firstly, raw materials such as a resin for a substrate (for example, PVC), a plasticizer, a stabilizer, a lubricant, a pigment, a filler, and the like are formulated in a calendaring machine. The resulting material was passed through the calendering machine to form a sheet. Textile fabrics are attached to the back side of the sheet, followed by foaming and embossing in a foaming machine. Then, a composition for surface treatment capable of electron beam cross-linking is coated onto a surface of the sheet using a printing machine. Coating may be performed before or after embossing in the foaming machine. Lastly, the coated composition for surface treatment is cross-linked by electron beam irradiation in an electron beam cross-linking machine to form a surface-treated layer, which is used for preparation of an interior sheet for vehicles.

In addition, the electron beam surface treatment agent may be any of solvent type, one-liquid type, two-liquid type, aqueous one-liquid type, aqueous two-liquid type, and non-solvent type electron beam surface treatment agents.

The processes in the foaming machine may be performed in-line up to electron beam cross-linking.

Next, the present invention will be described in more detail with reference to examples and comparative examples. However, it should be understood that the following examples and comparative examples are provided for illustration only, and are not to be construed in any way as limiting the present invention.

EXAMPLES

Example 1

After formulating raw materials including a PVC resin, a plasticizer, a stabilizer, a lubricant, a pigment, a filler, and the like in a Banbury mixer, the resulting material was passed through a calendering machine to form a sheet, which was then subjected to foaming and embossing in a foaming machine. Then, a composition for surface treatment capable of electron beam cross-linking was coated onto a surface of the PVC sheet by a printing machine. The coated composition for surface treatment was cross-linked by electron beam irradiation at a voltage of 150 keV and electron doses of 40 kGy in an electron beam cross-linking machine to form a 4 μm thick surface-treated layer, thereby preparing an interior sheet for vehicles.

The sheet thus prepared had an elongation of 150%. The composition for surface treatment was prepared by mixing 44 parts by weight of a trifunctional siloxane-modified urethane-based acrylate resin having three acrylate end groups, 56 parts by weight of a bifunctional siloxane-modified urethane-based acrylate resin having two acrylate end groups, 10 parts by weight of polysiloxane (KF-6001, Shin-Etsu Co., Ltd.), 25 parts by weight of silicone acrylate (BYK-UV 3570, BYK Co., Ltd.), 3 parts by weight of a dispersant, 3 parts by weight of a defoaming agent, 15 parts by weight of a matting agent, and 150 parts by weight of methylethylketone as a solvent (MEK Co., Ltd.).

Comparative Example 1

After formulating raw materials including a PVC resin, a plasticizer, a stabilizer, a lubricant, a pigment, a filler, and the like in a Banbury mixer, the resulting material was passed through a calendering machine to form a sheet. Textile fabrics were attached to the sheet, followed by foaming and embossing in a foaming machine. Then, a composition for surface treatment was coated onto a surface of the PVC sheet by a printing machine. The PVC sheet, coated with the composition for surface treatment, was subjected to heat treatment at 100° C. for 1 minute to heat cure the composition for surface treatment, thereby forming a 4 μm thick surface-treated layer, which in turn was used to prepare an interior sheet for vehicles.

The sheet thus prepared had an elongation of 150%. The heat curable composition for surface treatment was prepared by mixing 50 wt % of polyurethane, 45 wt % of methylethylketone (manufactured by MEK Co., Ltd.) and 5 wt % of other additives.

Experimental Example 1

The interior sheet samples for vehicles prepared in Example 1 and Comparative Example 1 were evaluated as to stain resistance. Stain resistance was measured using a Martindale Abrasion Tester. After rubbing the sheet samples with staining fabrics, Materials (Europe) at a force of 12 kPa 1000 times, the sheet samples were left in an 80° C. oven for 4 hours. Then, the sheet samples were hand washed using a cotton rubbing cloth and 0.5 wt % of soaps as a detergent under sufficient pressure, and stain resistance grade was rated according to a 5-point scale. Higher scores represent better stain resistance.

Experimental Example 2

The interior sheet samples for vehicles prepared in Example 1 and Comparative Example 1 were evaluated as to cold resistance. Evaluation of cold resistance was measured in accordance with Cold Resistance Tester KS M 3601. Cold resistance was determined by detecting crack occurrence. Results are shown in Table 1.

Experimental Example 3

The interior sheet samples for vehicles prepared in Example 1 and Comparative Example 1 were evaluated as to sunscreen contamination. 2 g of a sunscreen (SP+++ 50) was applied to white cloths, which in turn were placed on the sheets. The sheets were covered with an acrylic board, left in an 80° C. oven for 1 hour, removed from the oven, and cooled for 1 hour. After wiping the sheets with a neutral detergent, changes in surface state of the sheets were evaluated. The sheets were evaluates as to swelling or discoloring, crack occurrence, stain resistance, and the like, and results are shown in Table 1.

TABLE 1

| | Stain resistance | Suncream | Cold resistance (−30° C.) |
|---|---|---|---|
| Example 1 | 4.3 | Good | No crack |
| Comparative Example 1 | 2.1 | Swelling, minute discoloring | No crack |

The invention claimed is:

1. An interior sheet for vehicles, comprising a surface-treated layer formed by electron beam cross-linking of 100 parts by weight of a siloxane-modified urethane-based acrylate resin, 20 parts by weight to 35 parts by weight of a silicone acrylate, and 1 part by weight to 15 parts by weight of a polysiloxane.

2. The interior sheet for vehicles according to claim 1, wherein the siloxane-modified urethane-based acrylate resin comprises bifunctional siloxane-modified urethane-based acrylate resins and trifunctional siloxane-modified urethane-based acrylate resins.

3. The interior sheet for vehicles according to claim 1, wherein the surface-treated layer has a thickness of about 1 µm to about 20 µm.

4. The interior sheet for vehicles according to claim 1, further comprising: a substrate comprising one selected from the group consisting of polyvinyl chloride, polyurethane, thermoplastic polyurethane, thermoplastic polyolefin resins, and combinations thereof.

5. The interior sheet for vehicles according to claim 1, wherein the surface-treated layer has an elongation of about 20% to about 150%.

6. The interior sheet for vehicles according to claim 1, wherein the surface-treated layer further comprises an additive selected from the group consisting of dispersants, matting agents, defoaming agents, and combinations thereof.

7. A method for manufacturing an interior sheet for vehicles, comprising:

applying a composition for surface treatment to a substrate, the composition for surface treatment comprising 100 parts by weight of a siloxane-modified urethane-based acrylate resin, 20 parts by weight to 35 parts by weight of a silicone acrylate, and 1 part by weight to 15 parts by weight of a polysiloxane; and irradiating the applied composition with electron beams to form a surface-treated layer.

8. The method for manufacturing an interior sheet for vehicles according to claim 7, wherein the surface-treated layer is formed by electron beam irradiation at a voltage of about 50 keV to about 300 keV.

9. The method for manufacturing an interior sheet for vehicles according to claim 7, wherein the surface-treated layer is formed by electron beam irradiation at an electron dose of about 10 kGy to about 100 kGy.

10. The method for manufacturing an interior sheet for vehicles according to claim 7, wherein the substrate comprises one selected from the group consisting of polyvinyl chloride, polyurethane, thermoplastic polyurethane, thermoplastic polyolefin resins, and combinations thereof.

* * * * *